INVENTOR.
ROBERT M. MILTON

United States Patent Office 3,078,639
Patented Feb. 26, 1963

1

3,078,639
CARBON DIOXIDE REMOVAL FROM VAPOR MIXTURES
Robert M. Milton, Buffalo, N.Y., assignor to Union Carbide Corporation, a corporation of New York
Filed Jan. 19, 1960, Ser. No. 3,364
8 Claims. (Cl. 55—68)

This invention relates to a method for adsorbing fluids and separating a mixture of fluids into its component parts. More particularly, the invention relates to a method of separating carbon dioxide with adsorbents of the molecular sieve type. Still more particularly, this invention relates to a method for preferentially adsorbing carbon dioxide from a fluid mixture containing at least one member of the group consisting of saturated aliphatic hydrocarbons containing less than five carbon atoms per molecule, unsaturated hydrocarbons containing less than three carbon atoms per molecule, nitrogen, hydrogen and carbon monoxide.

This application is a continuation-in-part of my copending application Serial No. 400,386 filed December 24, 1953, now abandoned.

Illustrating the utility of this invention, it is often desirable to remove carbon dioxide from streams containing hydrogen, nitrogen, oxygen, carbon monoxide or air, or mixtures of the above gases, when they are to be processed at low temperatures. This is because carbon dioxide would condense as a solid material at the low processing temperatures and thus impair the operating efficiency of low temperature heat exchanges. The preferential adsorption of carbon dioxide from saturated hydrocarbons may be used to advantage in the up-grading of fuel gases, by removal of non-combustible carbon dioxide.

In the manufacture of polyethylene from ethylene in the presence of catalysts it is of great importance that the ethylene be substantially free from carbon dioxide since the presence of even very small amounts of carbon dioxide has a detrimental effect on the catalysts.

Broadly, the invention comprises mixing molecules, in a fluid state, of the materials to be adsorbed or separated with at least partially dehydrated crystalline synthetic zeolite X.

Zeolite X, and the methods for making zeolite X are described in detail and claimed in U.S. patent application Serial No. 400,389 filed December 24, 1953, now U.S. Patent No. 2,882,244 issued April 14, 1959, in the name of R. M. Milton.

It is the principal object of the present invention to provide a process for the selective adsorption of molecules from fluids. A further object of the invention is to provide a method whereby certain molecules may be adsorbed and separated by crystalline synthetic zeolite X.

Figure 1:
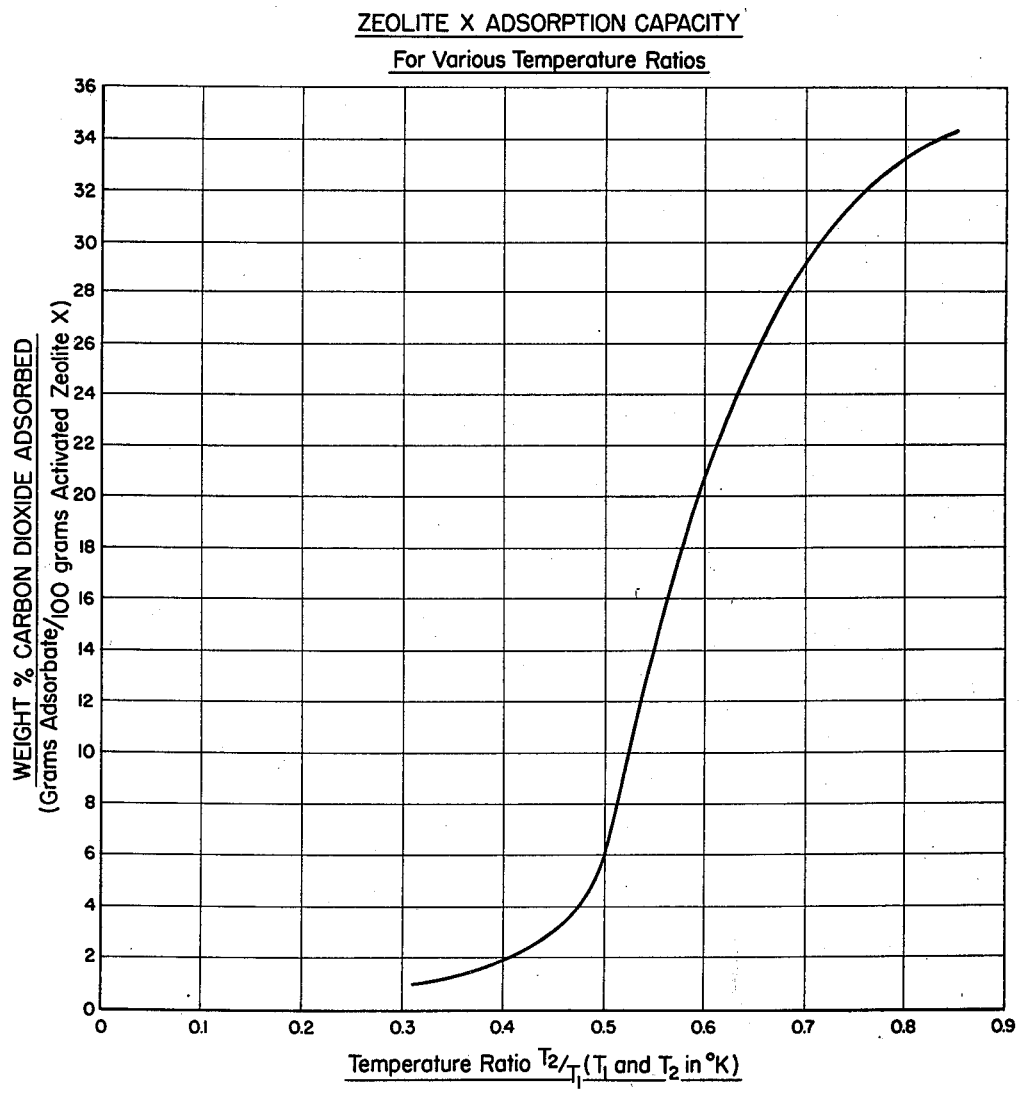
FIGURE 1 is a graph showing the weight percent of carbon dioxide adsorbed versus the temperature ratio $T_2/T_1$ for zeolite X.
Figure 2:
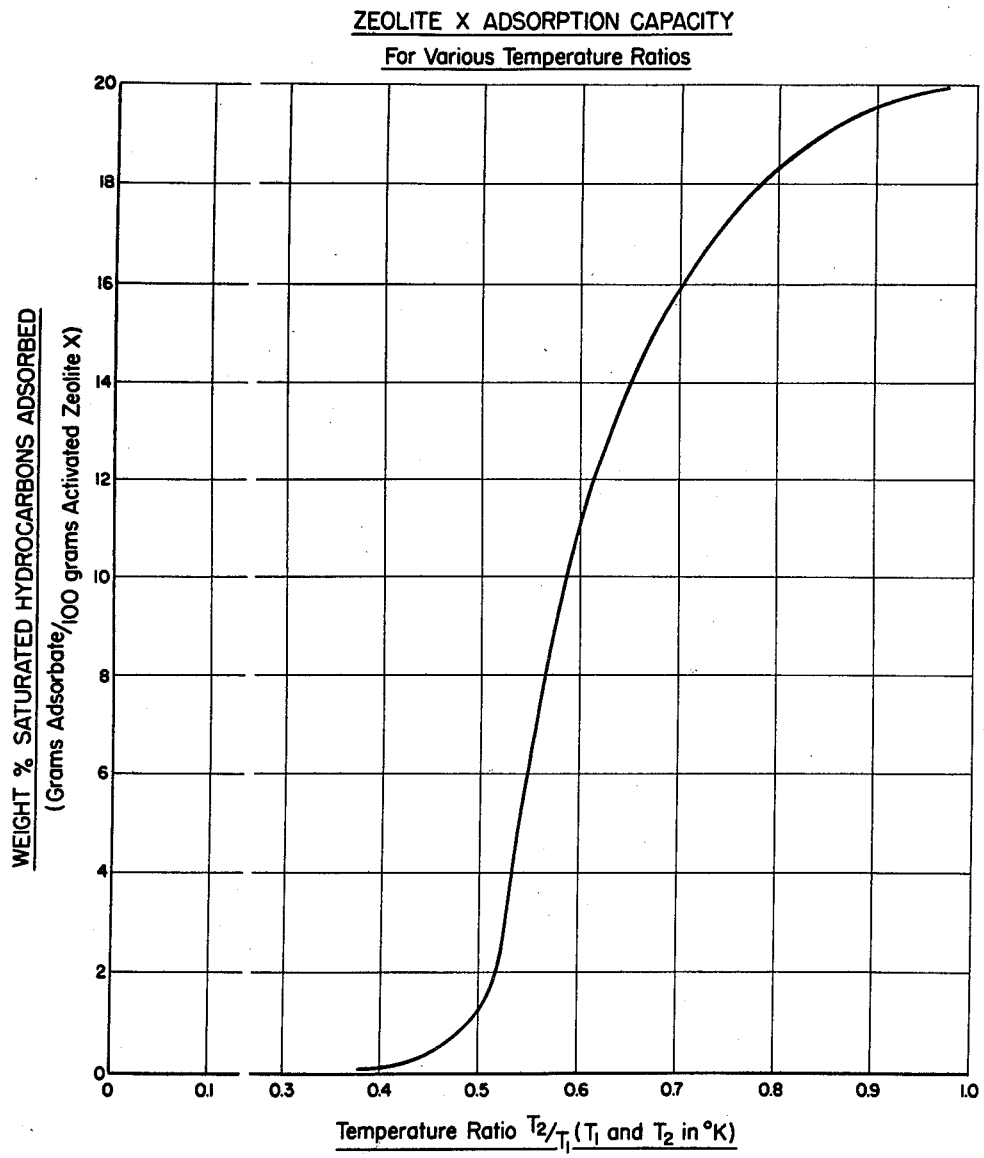
FIGURE 2 is a graph showing the weight percent of saturated hydrocarbons adsorbed versus the temperature ratio $T_2/T_1$ for zeolite X.

The formula for zeolite X may be written as follows:

$$0.9 \pm 0.2 M_{\frac{2}{n}}O:Al_2O_3:2.5 \pm 0.5 SiO_2:YH_2O$$

In this formula "M" represents a metal, "n" its valence, and "Y" may be any value up to 8 depending on the identity of the metal and the degree of dehydration of the crystals. X-ray diffraction data may be employed to define the crystal structure of zeolite X. Such information and processes for synthesizing zeolite X are provided in U.S. Patent 2,882,244.

The adsorbents contemplated herein include not only the sodium form of zeolite X, which is a common form produced but also crystalline materials obtained from such a zeolite by partial or complete replacement of the sodium ion with other cations. The sodium cations can be replaced, in part or entirely by ion exchange with other monovalent, divalent or trivalent cations. This may be accomplished by ion exchange techniques.

The following data contained in Table I shows zeolite X adsorption of carbon dioxide, saturated aliphatic hydrocarbons containing less than five carbon atoms per molecule, unsaturated hydrocarbons containing less than three carbon atoms per molecule and low boiling point gases, nitrogen, hydrogen and carbon monoxide. In this table, as elsewhere in the specification, the term "weight percent adsorbed" refers to the percentage increase in the weight of the adsorbent.

TABLE I

| Adsorbent | Adsorbate | Temperature, °C. | Pressure, mm. Hg. | Weight Percent Adsorbed |
|---|---|---|---|---|
| $Na_2X$ | $CO_2$ | 25 | 0.1 | 2.7 |
| $Na_2X$ | $CO_2$ | 25 | 1.6 | 3.7 |
| $Na_2X$ | $CO_2$ | 25 | 80 | 18.0 |
| $Na_2X$ | $CO_2$ | 25 | 50 | 15.7 |
| $Na_2X$ | $CO_2$ | 25 | 750 | 26.3 |
| $Na_2X$ | $CO_2$ | 25 | 4 | 6.3 |
| $Na_2X$ | $CO_2$ | 25 | 10 | 9 |
| $Na_2X$ | $CO_2$ | 25 | 25 | 12.5 |
| $Na_2X$ | $CO_2$ | −78 | 30 | 35.6 |
| $Na_2X$ | $CO_2$ | −78 | 8 | 31.2 |
| $Na_2X$ | $CH_4$ | 25 | 500 | less than 1 |
| $Na_2X$ | $C_2H_6$ | 25 | 5 | 0.2 |
| $Na_2X$ | $C_2H_6$ | 25 | 25 | 0.8 |
| $Na_2X$ | $C_2H_6$ | 25 | 300 | 8.3 |
| $Na_2X$ | $C_2H_6$ | 25 | 700 | 10.2 |
| $Na_2X$ | $C_3H_8$ | 25 | 1 | 0.8 |
| $Na_2X$ | $C_3H_8$ | 25 | 5 | 3.1 |
| $Na_2X$ | $C_3H_8$ | 25 | 4 | 2.6 |
| $Na_2X$ | $C_3H_8$ | 25 | 25 | 11.1 |
| $Na_2X$ | $C_3H_8$ | 25 | 700 | 14.6 |
| $Na_2X$ | $n\text{-}C_4H_{10}$ | 25 | 700 | 17.8 |
| $Na_2X$ | $n\text{-}C_4H_{10}$ | 25 | 710 | 17.6 |
| $Na_2X$ | $n\text{-}C_4H_{10}$ | 25 | 729 | 17.6 |
| $Na_2X$ | $n\text{-}C_4H_{10}$ | 25 | 0.2 | 2.4 |
| $Na_2X$ | $n\text{-}C_4H_{10}$ | 25 | 5.5 | 11.5 |
| $Na_2X$ | $n\text{-}C_4H_{10}$ | 25 | 400 | 18.4 |
| $Na_2X$ | $n\text{-}C_5H_{12}$ | 25 | 205 | 18.4 |
| $Na_2X$ | $n\text{-}C_5H_{12}$ | 25 | 224 | 19.3 |
| $Na_2X$ | $C_2H_2$ | 25 | 1 | 4.6 |
| $Na_2X$ | $C_2H_2$ | 25 | 5 | 6.6 |
| $Na_2X$ | $C_2H_2$ | 25 | 25 | 9.8 |
| $Na_2X$ | $C_2H_2$ | 25 | 50 | 10.6 |

TABLE I—Continued

| Adsorbent | Adsorbate | Temperature, °C. | Pressure, mm. Hg. | Weight Percent Adsorbed |
|---|---|---|---|---|
| Na₂X | C₂H₂ | 25 | 200 | 13.3 |
| Na₂X | C₂H₂ | 25 | 740 | 14.7 |
| Na₂X | C₂H₄ | 25 | 5 | 1.4 |
| Na₂X | C₂H₄ | 25 | 25 | 6.1 |
| Na₂X | C₂H₄ | 25 | 37 | 7.1 |
| Na₂X | C₂H₄ | 25 | 160 | 10.1 |
| Na₂X | H₂ | 25 | 100 | less than 1 |
| Na₂X | H₂ | −196 | 100 | less than 1 |
| Na₂X | N₂ | −196 | 5 | 24.8 |
| K₂X | N₂ | −196 | 195 | 27.5 |
| BaX | N₂ | −196 | 195 | 21.9 |
| Na₂X | N₂ | −75 | 500 | 9.6 |
| BaX | N₂ | −75 | 500 | 10.0 |
| K₂X | N₂ | −75 | 500 | 7.9 |
| Na₂X | N₂ | 25 | 500 | less than 1 |
| CaX | N₂ | −75 | 738 | 9 |
| BaX | N₂ | −75 | 738 | 10.8 |
| MnX | N₂ | −75 | 738 | 8.6 |
| Ce₂X₃ | N₂ | −75 | 738 | 5.3 |
| BaX | CO | −75 | 500 | 10.0 |
| CaX | CO | −75 | 25 | 5.4 |
| BaX | CO | −75 | 25 | 8.1 |
| MnX | CO | −75 | 25 | 4.5 |
| Ce₂X₃ | CO | −75 | 25 | 1.8 |
| CaX | CO | 0 | 25 | 2.5 |
| BaX | CO | 0 | 25 | 0.8 |
| MnX | CO | 0 | 25 | 0.8 |
| Ce₂X₃ | CO | 0 | 25 | 0.0 |
| CaX | CO | 0 | 750 | 5.1 |
| BaX | CO | 0 | 750 | 6.8 |
| MnX | CO | 0 | 750 | 4.2 |
| Ce₂X₃ | CO | 0 | 750 | 1.9 |
| Na₂X | CO | −75 | 500 | 15.8 |
| CaX | CO | 25 | 500 | 1.8 |

Another unique property of zeolite X is its strong preference for polarizable molecules, providing of course, that these molecules are of a size and shape which permits them to enter the pore system. This is in contrast to charcoal and silica gel which show a main preference based on the volatility of the adsorbate. The following table shows the adsorption of carbon dioxide, a polarizable molecule, on charcoal, silica gel and sodium zeolite X.

| Adsorbate | Temperature (°C.) | Pressure (mm. Hg) | Weight percent Adsorbed | | |
|---|---|---|---|---|---|
| | | | Na₂X | Silica Gel | Charcoal |
| Carbon Dioxide | 25 | 50 | 15.7 | 1.3 | 2.2 |

An illustration of the affinity of zeolite X for ethane, ethylene and propane is presented below.

| Pressure (mm. Hg) | Temperature (°C.) | Weight percent Adsorbed on Na₂X | |
|---|---|---|---|
| | | C₂H₆ | C₂H₄ |
| 5 | 25 | 0.2 | 1.4 |
| 25 | 25 | 0.8 | 6.1 |
| | | C₃H₈ | |
| 1 | 25 | 0.8 | |
| 5 | 25 | 3.1 | |

The adsorptive selectivity of zeolite X for carbon monoxide, a polar molecule is illustrated below.

| Adsorbate | Temperature (°C.) | Pressure (mm. Hg) | Weight percent Adsorbed on PaX |
|---|---|---|---|
| Carbon Monoxide | −75 | 500 | 10.0 |

An important characteristic of zeolite X is its property of adsorbing large amounts of adsorbates at low adsorbate pressures, partial pressures or concentrations. This property makes zeolite X useful in the removal of adsorbable impurities from gas mixtures since it has a relatively high adsorption capacity even when the material being adsorbed from a mixture is present in very low concentrations. Efficient recovery of minor components of mixtures is also possible. The high adsorption at low pressures on zeolite X are illustrated in the above Table I.

These data of Table I show that carbon dioxide is more strongly adsorbed than any other of the tabulated materials at comparable temperatures and pressures and illustrate several possible reparations by means of zeolite X. For example, zeolite X can be used for the selective adsorption of carbon dioxide from fluid mixtures containing both carbon dioxide and saturated aliphatic hydrocarbons.

The table also shows that at the same temperature (25° C. in the table) carbon dioxide is more strongly adsorbed at a given pressure than are nitrogen, hydrogen and carbon monoxide. Thus, carbon dioxide may be removed from mixtures with these less strongly adsorbed gases by means of zeolite X.

Likewise, Table I shows that carbon dioxide is more strongly adsorbed than ethylene so that carbon dioxide may be readily removed from ethylene mixtures through the use of zeolite X.

An advantage that may be taken of this high adsorption of zeolite X at low pressures is the operation of adsorption processes at higher temperatures than are normally used with common adsorbents. The adsorptive power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures.

Zeolite X may be used as an adsorbent for the purposes indicated above in any suitable form. For example, a column of powdered crystalline material has given excellent results as has a pelleted form obtained by pressing into pellets a mixture of zeolite X and a suitable binding agent such as clay.

The present process for separating carbon dioxide from certain vapor mixtures depends upon interrelated properties of zeolite X with respect to the adsorbed phase. The first property is the selectivity of the internal surfaces of the crystal towards this strongly polarizable compound as compared to saturated aliphatic hydrocarbons, unsaturated hydrocarbons, nitrogen, hydrogen and carbon monoxide. As previously discussed and illustrated by Table I, zeolite X is capable of adsorbing all of these constituents based on a consideration of the zeolite X pore size and critical molecular dimensions of the compounds. For example, the pores of zeolite X are sufficiently large and in fact do receive methane, pentane, ethylene, nitrogen, hydrogen and carbon monoxide.

Based on these considerations, one skilled in the art would logically conclude that zeolite X would not possess any particular selectivity for carbon dioxide in preference to the other constituents of the present vapor mixture. Contrary to these expectations, it has been discovered that zeolite X possesses an extremely strong selectivity for carbon dioxide to the substantial exclusion of saturated and unsaturated aliphatic hydrocarbons, hydrogen, nitrogen and carbon monoxide. One reason for this selectivity is the highly polarizable nature of carbon dioxide as compared with the other possible constituents of the vapor mixture.

A second interrelated property is the relationship of the boiling point or vapor tension characteristics of an individual fluid or clearly related type of fluid to the capacity of the crystalline zeolite X to adsorb carbon dioxide at a given temperature and pressure. More specifically it has been discovered that a relationship exists between the amount of carbon dioxide adsorbed by zeolite X, and the temperature ratio $T_2/T_1$ where $T_1$ is the temperature in degrees Kelvin at which the adsorption is carried out, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point determined at the adsorption conditions.

This relationship is clearly shown in FIG. 1 which is a plot of the weight percent of carbon dioxide adsorbed versus the temperature ratio $T_2/T_1$ for zeolite X. Table II is a summary of the data from which FIG. 1 was prepared, the data for the first five examples having been assembled from tests described in more detail in other parts of the specification. That is, the $T_1$ values for these examples were obtained from the preceding portion of the specification. The $T_2$ values were read from the vapor pressure tables in "Industrial and Engineering Chemistry," vol. 39, page 517, April 1947.

The plots of FIGS. 2, 3, 4 and 5 are presented to illustrate in conjunction with FIG. 1 the preferential adsorption of carbon dioxide which is obtained through the use of zeolite X.

TABLE II

| Adsorbate | Pressure (mm. Hg) | Weight Percent Adsorbed | $T_1$, °K. | $T_2$, °K. | $T_2/T_1$ |
|---|---|---|---|---|---|
| $CO_2$ | 0.1 | 2.7 | 298 | 126 | 0.42 |
|  | 1.6 | 3.7 | 298 | 141 | 0.47 |
|  | 80 | 18.0 | 298 | 171 | 0.58 |
|  | 750 | 26.3 | 298 | 194 | 0.65 |
|  | 50 | 15.7 | 298 | 166 | 0.56 |
|  | 4 | 6.3 | 298 | 147 | 0.50 |
|  | 10 | 9 | 298 | 154 | 0.52 |
|  | 25 | 12.5 | 298 | 160 | 0.54 |
|  | 30 | 35.6 | 195 | 162 | 0.83 |
|  | 8 | 31.2 | 195 | 152 | 0.78 |

An inspection of Table II will reveal that it includes carbon dioxide adsorption at temperatures from −78° C. to 25° C. and adsorbate pressures from 0.1 mm. Hg to 750 mm. Hg. The present invention utilizes this temperature ratio relationship in combination with the previously discussed polarizable compound selectivity property of zeolite X with respect to carbon dioxide to provide a novel separation process.

The present invention combines the previously discussed properties of zeolite X in such a manner that a novel process is provided for separating carbon dioxide from a vapor mixture containing at least one member of the group consisting of saturated aliphatic hydrocarbons containing less than five carbon atoms per molecule, unsaturated hydrocarbons containing less than three carbon atoms per molecule, hydrogen, nitrogen and carbon monoxide. In its broadest form, the process consists of contacting the vapor mixture with a bed of at least partially dehydrated crystalline zeolite X adsorbent material. The carbon dioxide depleted vapor mixture is then discharged from the crystalline zeolite X bed. Such contact is preferably effected under conditions such that the temperature ratio $T_2/T_1$ with respect to the inlet end of the bed and with respect to the carbon dioxide of the vapor mixture is between 0.43 and 1.0, where $T_1$ is the adsorption temperature and is less than 973° K., and $T_2$ is the temperature at which the carbon dioxide has a vapor pressure equal to its partial pressure in the vapor mixture. The lower limit of 0.43 for the temperature ratio $T_2/T_1$ is fixed by the discovery that below this value there is a smaller percentage change in adsorption capacity per unit change in the temperature ratio. In contrast, above 0.43 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.43 than if it is maintained above this value in accordance with the invention. Also, the temperature ratio of 0.43 corresponds to a bed loading of about 2.5 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of the carbon dioxide will occur, thereby essentially eliminating the sieving action of the zeolite X adsorbent. The broad upper limit of 973° K. for $T_1$ is due to the fact that above this temperature, the crystal structure of zeolite X will be disrupted or damaged with consequent loss of adsorption capacity and reduction in pore size, thereby fundamentally changing its adsorptive characteristics.

For carbon dioxide adsorption from a mixture containing saturated hydrocarbon, the present process is most efficiently performed if $T_1$, the adsorption temperature is less than 644° K. but higher than 233° K. This is for the reason that above such range, the saturated hydrocarbon in contact with zeolite X will tend to crack, isomerize, aromatize and polymerize, all of which will clog the pores and cause loss of capacity of the zeolite X molecular sieve. Below 233° K. relatively economical refrigerants such as Freon-12 cannot be employed, thereby necessitating more expensive refrigerating systems. Also, the mechanical properties of metals deteriorate rapidly below about 233° K., so that special construction materials must be employed for adsorbers operating in this low temperature range. The increase in zeolite X adsorptive capacity for carbon dioxide at reduced temperatures justifies the employment of refrigeration down to the 233° K. level. Furthermore, for maximum efficiency, $T_2$ is preferably below 304° K. which is the critical temperature of carbon dioxide. This is to more effectively utilize the adsorptive capacity of zeolite X.

In the adsorption of carbon dioxide from a mixture containing unsaturated hydrocarbons containing less than three carbon atoms per molecule, the present process is most efficiently performed if $T_1$ is less than 533° K. but higher than 233° K. Above this range the hydrocarbon will tend to isomerize, crack, aromatize and polymerize, all of which will clog the pores and cause loss of capacity of the zeolite X molecular sieve. Also, for maximum efficiency, $T_2$ is preferably below 304° K., the critical temperature of carbon dioxide.

The present invention also contemplates a process for continuously separating carbon dioxide from a vapor mixture containing at least one member of the group consisting of saturated aliphatic hydrocarbons containing less than five carbon atoms per molecule, unsaturated hydrocarbons containing less than three carbon atoms per molecule, hydrogen, nitrogen and carbon monoxide. This continuous process includes two steps, an adsorption stroke and a regeneration stroke. The adsorption stroke is the same as the previously described adsorption where the temperature ratio $T_2/T_1$ is between 0.43 and 1.0; and the broad range for $T_1$ is less than 973° K. In the regeneration stroke, at least part of the adsorbed carbon dioxide is removed by subjecting the zeolite X adsorbent to conditions such that the temperature ratio $T_2/T_1$ at the end of the regeneration stroke with respect to the carbon dioxide is less than the temperature ratio at the end of the adsorption stroke. Also, the difference in total adsorbate loading between the ends of the adsorption and regeneration strokes is at least 0.5 weight percent for increased efficiency of the overall continuous process. A lower differential adsorbate loading would entail prohibitively large adsorber units. During the regeneration stroke, $T_1$ is the regeneration temperature and is less than 973° K. for the broad range and $T_2$ is the temperature at which the carbon dioxide has a vapor pressure equal to its partial pressure over the zeolite X bed at the end of the regeneration. It will be understood by those skilled in the art that at least two adsorbent beds may be provided, with one bed on adsorption stroke and the other bed on regeneration stroke. The respective flows are then periodically switched when the first bed becomes loaded with the adsorbate so that the latter is placed on regeneration stroke and the second bed is placed on-stream.

For carbon dioxide adsorption from mixtures containing saturated hydrocarbons, the continuous process is most efficiently performed if $T_1$, the adsorption temperature, is less than 644° K. but higher than 233° K. for previously stated reasons. Also, for maximum efficiency during the adsorption stroke, $T_2$ is below 304° K., the critical temperature of carbon dioxide. During the regeneration stroke, $T_1$ is preferably below 644° K. and above 233° K., also for the previously discussed reasons.

For carbon dioxide adsorption from a mixture containing unsaturated hydrocarbons, the continuous process is most efficiently performed if $T_1$ is less than 533° K. but higher than 233° K. for previously stated reasons. Also for maximum efficiency during the adsorption stoke, $T_2$ is below 304° K. During the regeneration stroke, $T_1$ is preferably below 533° K. and above 233° K., also for the previously discussed reasons.

Finally, the difference in total carbon dioxide loadings between the ends of the adsorption and regeneration strokes is preferably at least 1.0 weight percent for increased efficiency of the overall process.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke, the ratio may be adjusted for favorable operation by varying either or both the temperature and the pressure.

The many advantages of the invention are illustrated by the following examples:

*Example I*

A vapor mixture is provided containing 0.1 mole fraction carbon dioxide, the remainder being methane, at a total pressure of 100 p.s.i.a. The mixture is to be contacted with a bed of zeolite X at a temperature of 25° C. The zeolite bed is to be regenerated for continuous operation.

The potential capacity of the bed to adsorb carbon dioxide at the bed inlet section may be determined as follows: Since the partial pressure of carbon dioxide is 10 p.s.i.a., $T_2$ will be 189° K., as read from the previously referenced vapor pressure table. Accordingly, $T_2/T_1$ will be 189/298=0.64. This temperature ratio will provide a loading of 25 weight percent of carbon dioxide on the zeolite X adsorbent as determined by a reading of the FIG. 1 graph. The potential capacity of the adsorbent bed inlet end for methane may be determined in a similar manner by reference to FIG. 2. For methane, $T_2$ is 139° K. and $T_2/T_1$ is equal to 0.47 which will provide a loading of 0.6 weight percent. The adsorption may be terminated when traces of carbon dioxide first appear in the effluent if complete elimination of carbon dioxide from the effluent is desired.

During the regeneration stroke, the bed temperature is kept at 453° K. and the pressure is reduced to 14.7 p.s.i.a. corresponding to a $T_2$ value of 195° K. with respect to carbon dioxide. Under these conditions, the $T_2/T_1$ ratio will be 0.43 and the residual loading of carbon dioxide will be reduced to about 2.5 weight percent.

*Example II*

A vapor mixture is provided containing 0.04 mole fraction carbon dioxide, the remainder being ethylene, at a total pressure of 200 p.s.i.a. The mixture is to be contacted with a bed of zeolite X at 25° C. The zeolite bed is to be regenerated by heating the feed stream and passing it therethrough as a purge gas. Under these conditions, the potential capacity of the bed to adsorb carbon dioxide and ethylene may be determined in the same manner as described previously in conjunction with Example I. That is, for carbon dioxide at the bed inlet section, $T_2$ will be 187° K. so that the temperature ratio $T_2/T_1$ is 0.63 which corresponds to a loading of 24 weight percent carbon dioxide on the adsorbent as read from FIG. 1. The potential capacity of the adsorbent bed at the inlet end for ethylene may be determined in a similar manner by reference to FIG. 5 to give a loading for ethylene of about 18.8 weight percent. The adsorption stroke, may be terminated when traces of carbon dioxide first appear in the effluent if complete elimination of carbon dioxide from the effluent is desired.

Assuming a desired residual carbon dioxide loading of about 2.5 weight percent, regeneration of the zeolite X used in Example II can be readily achieved by employing the feed gas as a purging medium, and heating the bed and/or such gas to provide a regeneration temperature of 435° K. (162° C.). This temperature is based on a $T_2/T_1$ value of 0.43 as read from FIG. 1 at a loading of about 2.5 weight percent and a $T_2$ of 187° K.

Alternatively, if regeneration is to be effected by drawing a vacuum pressure of 50 mm. Hg on the bed, $T_2$ would be 166° K. This temperature corresponds to the vapor pressure of carbon dioxide at 50 mm. Hg as read from the previously referenced table. Since the residual carbon dioxide loading is to be about 2.5 weight percent, $T_2/T_1$ will be 0.43 as read from FIG. 1. With this value for the temperature ratio, the required $T_1$ is 386° K.

Figure 3:
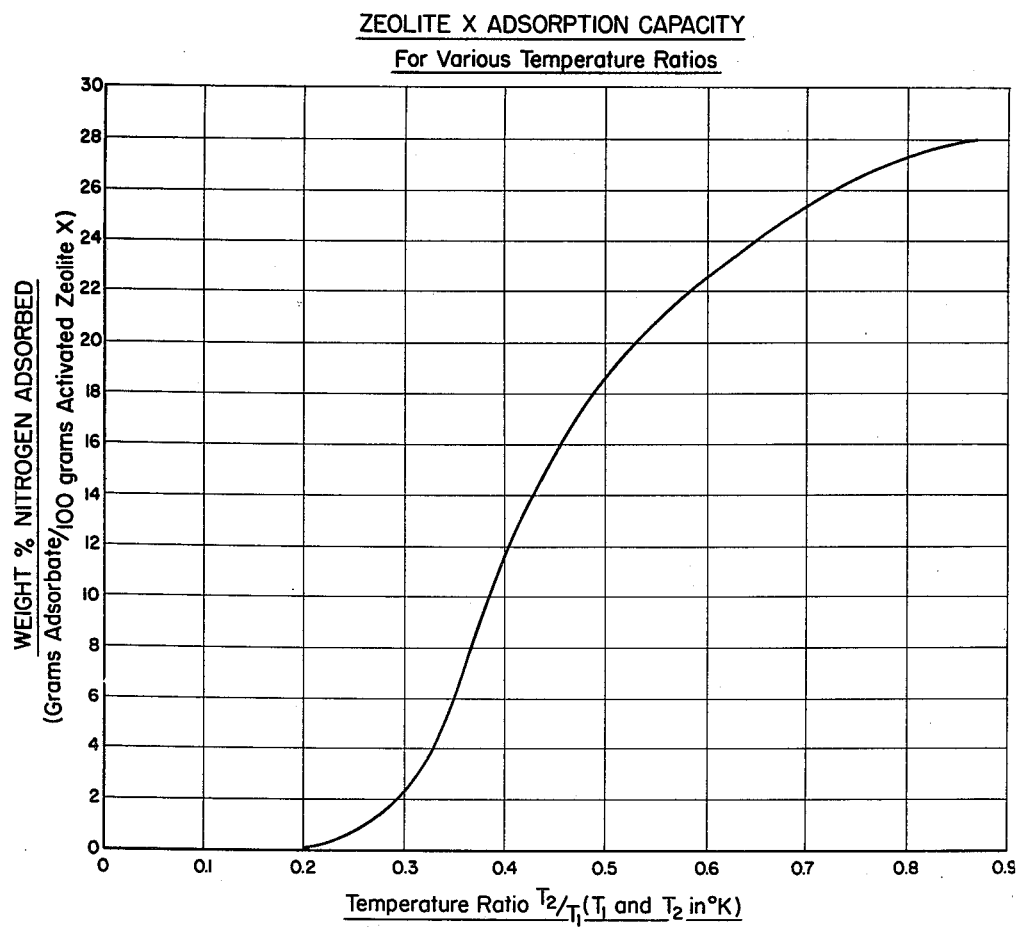
FIGURE 3 is a graph showing the weight percent of nitrogen adsorbed versus the temperature ratio $T_2/T_1$ for zeolite X.
Figure 4:
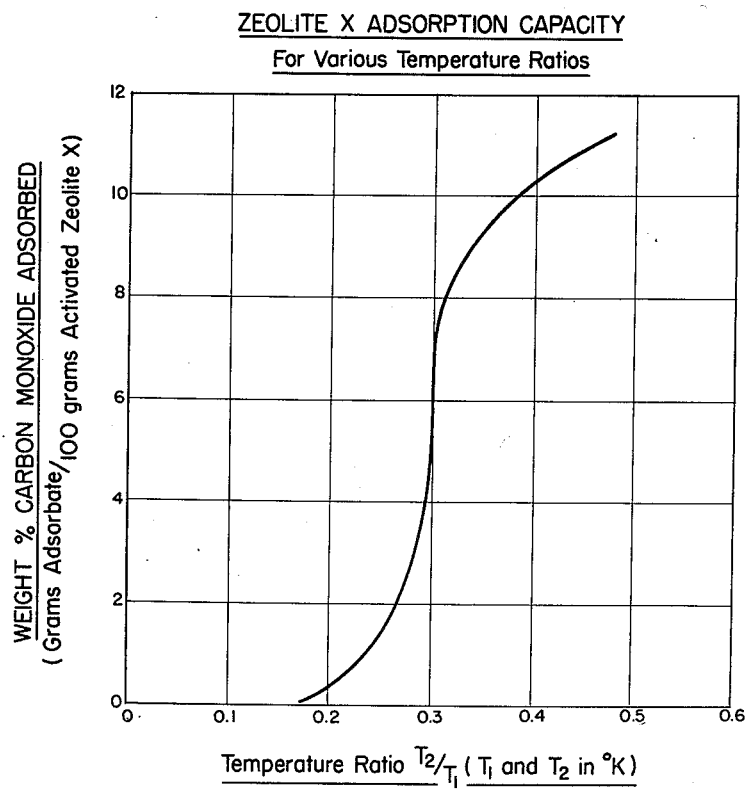
FIGURE 4 is a graph showing the weight percent of carbon monoxide adsorbed versus the temperature ratio $T_2/T_1$ for zeolite X.
Figure 5:
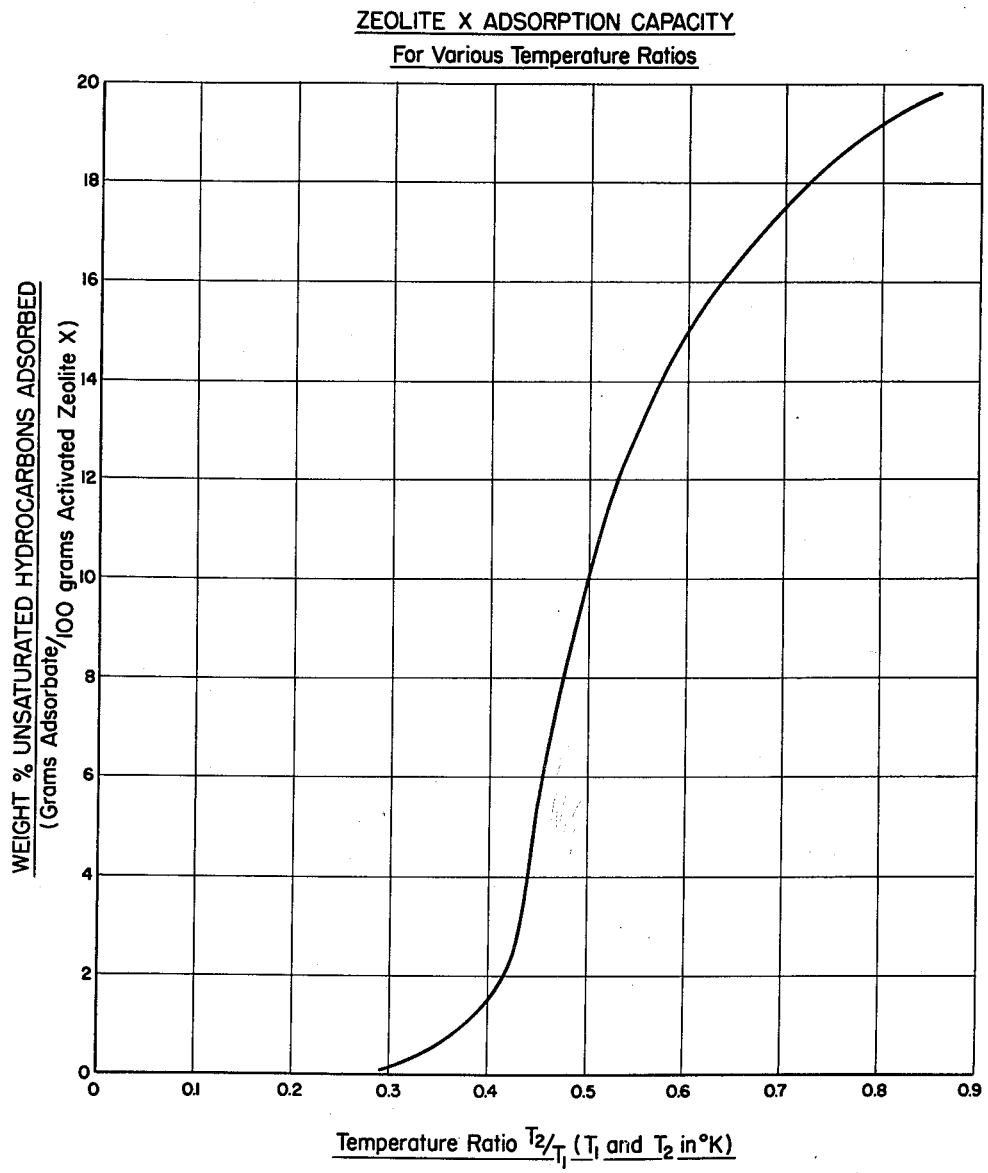
FIGURE 5 is a graph showing the weight percent of unsaturated hydrocarbons adsorbed versus the temperature ratio $T_2/T_1$ for zeolite X.

When the inlet vapor mixture contains nitrogen or carbon monoxide, the potential capacity of the zeolite X adsorbent for these constituents is similarly determined by reference to the vapor pressure tables and FIGS. 3 and 4, respectively. Also, if hydrogen is present, the potential capacity of zeolite X may be determined in an analogous manner.

Although the preferred embodiments have been described in detail, it is contemplated that modifications of the process may be made and that some features may be employed without others, all within the spirit and scope of the invention as set forth herein.

What is claimed is:

1. A process for separating carbon dioxide from a vapor mixture containing carbon dioxide and methane, which comprises contacting said vapor mixture with a bed of at least partially dehydrated crystalline zeolite X adsorbent material and thereafter discharging the carbon dioxide depleted vapor stream from said bed.

2. A process for separating carbon dioxide from a vapor mixture containing carbon dioxide and ethane, which comprises contacting said vapor mixture with a bed of at least partially dehydrated crystalline zeolite X adsorbent material and thereafter discharging the carbon dioxide depleted vapor stream from said bed.

3. A process for separating carbon dioxide from a vapor m'xing containing carbon dioxide and propane, which comprises contacting said vapor mixture with a bed of at least partially dehydrated crystalline zeolite X adsorbent material and thereafter discharging the carbon dioxide depleted vapor stream from said bed.

4. A process for separating carbon dioxide from a vapor mixture containing carbon d'oxide and butane, which comprises contacting said vapor mixture with a bed of at least partially dehydrated crystalline zeolite X adsorbent material and thereafter discharging the carbon dioxide depleted vapor stream from said bed.

5. A process for separating carbon diox'de from a vapor mixture containing carbon dioxide and ethylene, which comprises contacting said vapor mixture with a bed of at least partially dehydrated crystalline zeolite X adsorbent material and thereafter discharging the carbon dioxide depleted vapor stream from said bed.

6. A process for separating carbon dioxide from a vapor mixture containing carbon dioxide and hydrogen, which comprises contacting said vapor mixture with a bed of at least partially dehydrated crystalline zeolite X adsorbent material and thereafter discharging the carbon dioxide depleted vapor stream from said bed.

7. A process for separating carbon dioxide from a vapor mixture containing carbon dioxide and nitrogen, which comprises contacting said vapor mixture with a bed of at least partially dehydrated crystalline zeolite X adsorbent material and thereafter discharging the carbon dioxide depleted vapor stream from said bed.

8. A process for separating carbon dioxide from a vapor mixture containing carbon dioxide and carbon monoxide, which comprises contacting said vapor mixture with a bed of at least partially dehydrated crystalline zeolite X adsorbent material and thereafter discharging the carbon dioxide depleted vapor stream from said bed.

References Cited in the file of this patent

"Separation of Mixtures Using Zeolites as Molecular Sieves. Part I. Three Classes of Molecular-Sieve Zeolite" by R. M. Barrer, J. Soc. Chem. Ind., vol. 64, May 1945.

"Examine These Ways To Use Selective Adsorption," Petroleum Refiner, vol. 36, No. 7, July 1957, pages 136–140.